United States Patent [19]
Jenkins et al.

[11] 4,361,174
[45] Nov. 30, 1982

[54] WIRE WAFER FABRICATING PROCESS

[75] Inventors: Carlton G. Jenkins, Irvine; Robert R. Johnson, Ludlow, both of Pa.

[73] Assignee: GTE Products Corporation, Stamford, Conn.

[21] Appl. No.: 188,396

[22] Filed: Sep. 18, 1980

[51] Int. Cl.³ .......................................... B21F 11/00
[52] U.S. Cl. ..................................... 140/140; 83/198
[58] Field of Search ................. 140/139, 140; 83/196, 83/197, 198, 199, 200

[56] References Cited

U.S. PATENT DOCUMENTS

| | | | |
|---|---|---|---|
| 601,593 | 3/1898 | Shuster | 83/198 |
| 3,060,774 | 10/1962 | Warkoczewski | 83/198 |
| 3,972,257 | 8/1976 | Lazar, Jr. | 83/198 |
| 4,128,027 | 12/1978 | Fuchs | 83/198 |

FOREIGN PATENT DOCUMENTS

| | | | |
|---|---|---|---|
| 307856 | 7/1971 | U.S.S.R. | 83/198 |
| 649516 | 2/1979 | U.S.S.R. | 83/198 |

*Primary Examiner*—John McQuade
*Attorney, Agent, or Firm*—John A. Odozynski

[57] ABSTRACT

A process for fabricating wire wafers from wire stock wherein the wire stock is fed against a wire stop member, surrounded by a support member having wire cut-off and back-up tools located integral to the support member with the wire cut-off and back-up tools activated to provide first and second wire wafers and deactivated to return the wire cut-off and back-up tools to a position for a succeeding cycle.

8 Claims, 4 Drawing Figures

WIRE WAFER FABRICATING PROCESS

TECHNICAL FIELD

This invention relates to a process for fabricating wire wafers from wire stock and more particularly to a process for effecting multiple wire wafer fabrication from wire stock.

BACKGROUND ART

Generally, the fabrication of wire wafers from wire stock is effected by a so-called "end shear" technique. Therein, a wire wafer is sheared from the end of wire stock. Thereafter, the wire stock is re-positioned and another wafer is provided by again shearing off the end of the wire stock.

Although the above-described process has been and still is utilized with varying degrees of success, it has been found that problems are encountered. For example, it has been found that an end-shear process tends to produce a wire wafer having non-symmetrical surfaces and distortion. Also, the end shear technique tends to undesirably distort or roll-over the end of the wire stock during the shearing process.

SUMMARY OF THE INVENTION

In one aspect of the invention wire wafers are fabricated by a process wherein the wire stock is fed into a position contacting a stop member, the wire stock is surrounded by a support member adjacent the stop member, wire cut-off and back-up tools spaced from the stop member and integral to the support member are activated to cause the cut-off tool to sever the wire stock and provide a first wire wafer intermediate the wire cut-off tools and the stop member and a second wire wafer intermediate the wire cut-off and back-up tools.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
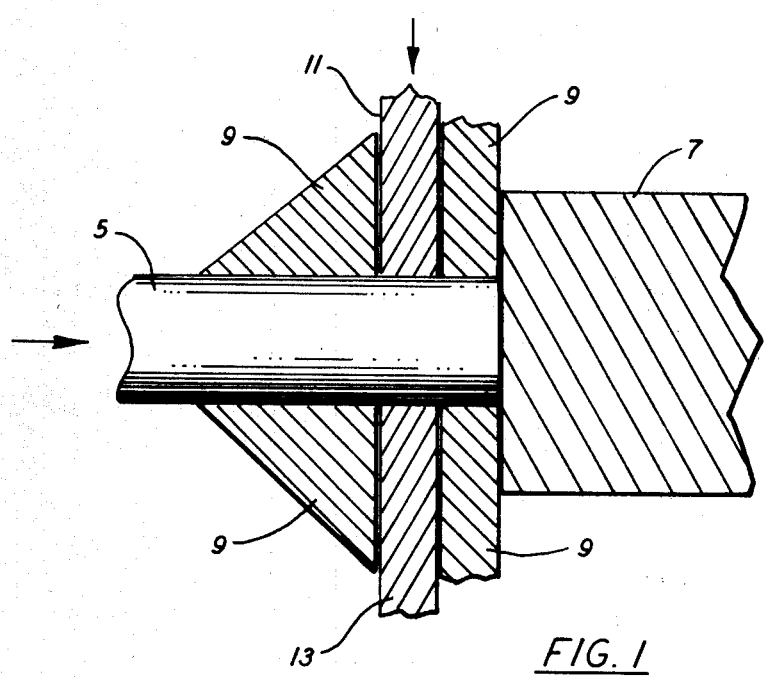
FIGS. 1, 2 and 3 are diagrammatic illustrations suitable to a process for fabricating wire wafers.
Figure 2:
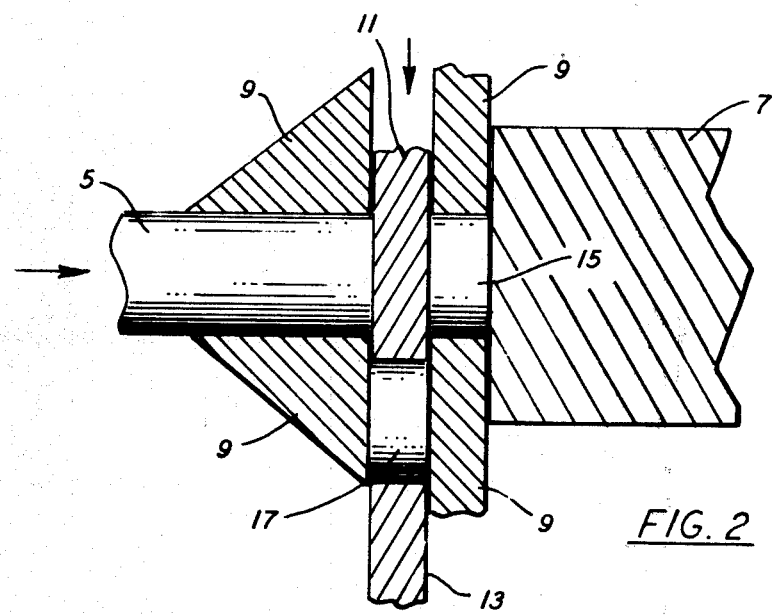

Referring to the diagrammatic illustrations of FIGS. 1 and 2, FIG. 1 sets forth wire stock 5 which has an end portion located against a stop member 7. Supporting gripper tools 9 are positioned in surrounding relationship to the wire stock 5 adjacent the stop member 7. A wire cut-off tool 11 and a wire back up tool 13 are integral to the wire supporting or gripper tools 9 and oppositely disposed with respect to the wire stock 7.

As to operation, as illustrated in FIG. 2, the wire cut-off tool 11 and wire back-up tool 13 are activated causing the wire cut-off tool 11 to sever the wire stock 5. Thereupon, there is provided a first wire wafer 15 disposed intermediate the wire cut-off and back-up tools 11 and 13 and the stop member 7. Also, a second wire wafer 17 is disposed intermediate the wire cut-off and back-up tools 11 and 13.

Figure 3:
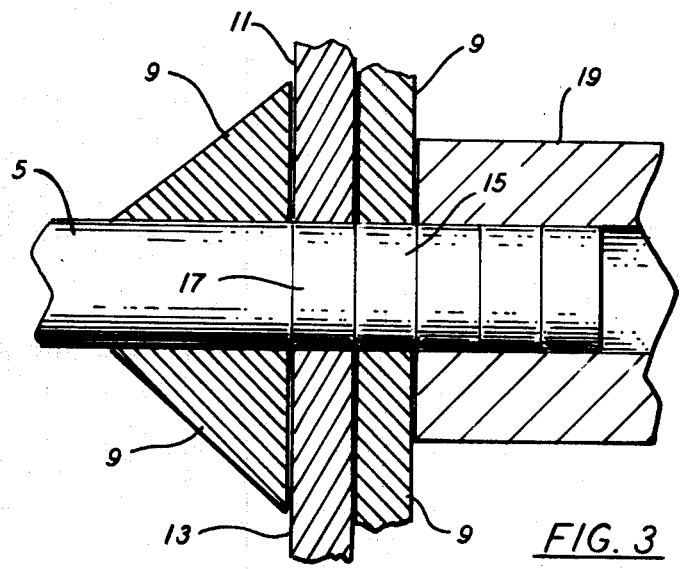

Following, as illustrated in FIG. 3, the wire cut-off and wire back-up tools 11 and 13 are de-activated whereupon the first and second wire wafers 15 and 17 are aligned along the axis of the wire stock 5. Thereafter, the stop member 7 is preferably, not necessarily, replaced by a wire wafer magazine 19 wherein the wire wafers are stored for future utilization.

Preferably, not necessarily, the first and second wire wafers 15 and 17 are both of a thickness less than the diameter of the wire stock 5. Also, it is to be understood that it is feasible, to have at least one of the wire wafers 15 and 17 of a thickness less than the diameter of the wire stock 5.

Figure 4:
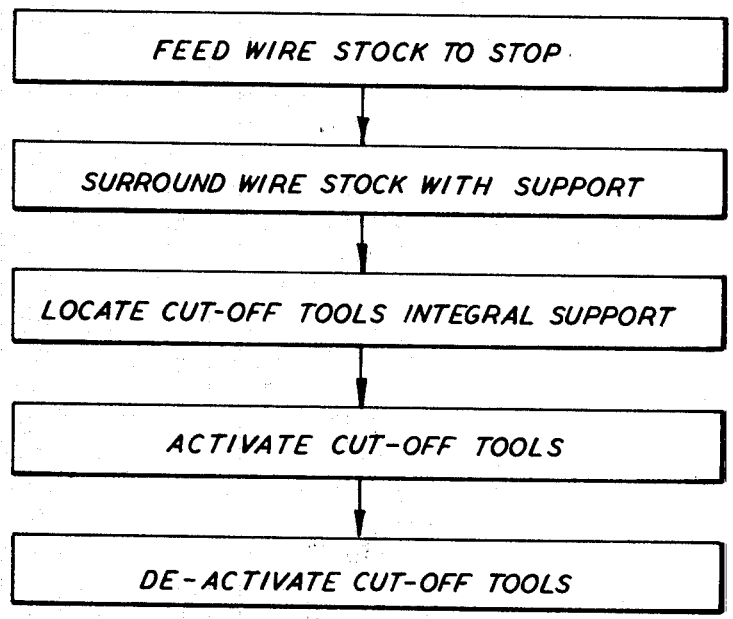
FIG. 4 is a flow chart of a preferred process for fabricating the wire wafers of FIGS. 1, 2 and 3.

Referring to the flow chart of FIG. 4, a preferred process for fabricating wire wafers from wire stock includes the steps of feeding the wire stock against a wire stop member, surrounding the wire stock with a support member adjacent the wire stop member and locating wire cut-off and wire back-up tools integral to the support member. Thereafter the wire cut-off and back-up tools are activated to cause the wire cut-off tool to sever the wire stock and provide first and second wire wafers. Following, the wire cut-off and back-up tools are de-activated to provide alignment of the wire wafers and positioning of the cut-off and back-up tools for a succeeding cycle.

While there has been shown and described what is at present the preferred embodiments of the invention, it will be obvious to those skilled in the art that various changes and modifications may be made therein without departing from the scope of the invention as defined by the appended claims.

INDUSTRIAL APPLICABILITY

Thus, there has been provided a unique process for fabricating wire wafers from wire stock. The process is especially suitable to the provision of wire wafers of a thickness less than the diameter of the wire stock and not only provides multiple wafers for each activation of the cutting tools but also provides wafers which tend to exhibit a reduced amount of non-symmetry and distortion.

We claim:

1. In a process for fabricating wire wafers from wire stock wherein wire stock supporting gripper tools are positioned adjacent a wire stop member and wire cut-off and back-up tools are positioned intermediate the wire stock supporting gripper tools the improvement comprising the steps of:
   activating said wire cut-off and back-up tools to cause said cut-off tool to sever said wire stock and provide a first wire wafer intermediate said wire cut-off tool and said wire stop member and a second wire wafer intermediate said wire cut-off and back-up tools;
   de-activating said wire cut-off and back-up tools to effect return of said second wire wafer into alignment with said first wire wafer;
   removing said stop member;
   substituting for said stop member a wire wafer magazine; and
   feeding said wire wafers into said wire wafer magazine.

2. The wire wafer fabricating process of claim 1 wherein said first and second wire wafers are of substantially the same thickness.

3. The wire wafer fabricating process of claim 1 including the steps of removing said first and second wire wafers and feeding said wire stock against said wire stop member.

4. The wire fabricating process of claim 1 wherein said first and second wire wafers are each of a thickness less than the diameter of said wire stock.

5. The wire fabricating process of claim 1 wherein at least one of said first and second wire wafers is of a thickness less than the diameter of said wire stock.

6. In a process for fabricating wire wafers from wire stock the improvement comprising the steps of:
   feeding wire stock against a wire stop member;
   surrounding said wire stock with support members adjacent said wire stop member;
   locating a wire cut-off tool and a wire back-up tool intermediate said support members;
   activating said wire cut-off and back-up tools to cause said wire cut-off tool to sever and pass through said wire stock and provide a first wire wafer intermediate said wire cut-off tool and said stop member and a second wire wafer intermediate said wire cut-off and back-up tools;
   de-activating said wire cut-off and back-up tools to effect alignment of said first and second wire wafers and positioning of said tools for a succeeding cycle;
   substituting a wire wafer magazine for said stop member;
   feeding said first and second wire wafers into said wire wafer magazine; and
   positioning said wire stock against said wire wafers in said wire wafer magazine.

7. The improvement of claim 6 wherein said first and second wire wafers are of a thickness less than the diameter of said wire stock.

8. The improvement of claim 6 wherein said first and second wire wafers are of substantially the same thickness.

* * * * *